INVENTOR.
HARRY MILLER
BY
ATTORNEY

Oct. 18, 1966

H. MILLER 3,279,724

LANDING CONTROL EQUIPMENT

Filed Oct. 12, 1964

INVENTOR.
HARRY MILLER
BY
S.C. Yeaton
ATTORNEY 3,279,724
LANDING CONTROL EQUIPMENT
Harry Miller, Scottsdale, Ariz., assignor to Sperry Rand Corporation, Great Neck, N.Y., a corporation of Delaware
Filed Oct. 12, 1964, Ser. No. 403,274
14 Claims. (Cl. 244—77)

This invention relates in general to apparatus for use with aircraft and in particular provides an improved form of aircraft landing control system.

Generally, as a principal feature of the invention, provision is made for controlling an aircraft to fly from a straight-line descent, through a flare-out maneuver and finally to touchdown onto a runway. In this sense then, the invention performs functions similar to those propounded in U.S. Patent 3,115,319, filed in the names of Myron Glaser and the instant inventor, and assigned to the instant assignee. In providing the principal feature of the invention, an improved form of altitude computer is employed, which computer obviates the need for radar-type altimeters as required in the aforesaid U.S. Patent 3,115,319 (element 18 thereof), yet provides their desirable characteristics. Hence, it may be said that there are two major aspects to the invention, the first being as a complete aircraft landing control system, and the second being in the form of an altitude computer for use in a landing control system.

Before discussing the general characteristics of the overall landing system, the nature of the instant altitude computer will be outlined: At airports where conventional Instrument Landing Systems (hereafter referred to as ILS) are installed, outer and middle marker beacons cause fan-shaped radio beams to project vertically upward away from the earth to intersect their respective ILS radio-defined glide slope courses, whereby a pilot flying one of these courses may be alerted by means of relay-operated audible and/or visual alarms to craft position along his glide slope. Consideration is also being given to installing special marker beacons which will intersect the glide slope beam exactly 100 feet above the runway. The altitude computer of the present invention proposes to provide a first signal representative of the absolute altitude (with respect to runway altitude) at which one of the marker beacon beams, say the middle marker, or the 100 feet beacon intersects the ILS glide slope beam and from the instant the craft is at such point of intersection a second altitude signal, representing the instantaneous barometric altitude with respect to the barometric altitude had at the aforesaid intersection point, is algebraically combined with the first signal to provide the altitude signal of the invention. In other words, the present altitude computer provides an altitude signal representing barometric deviation from a particular radio-defined (by means of intersecting beams) altitude. By employing this technique, expensive radar altimeters (with their inherent subjection to terrain) are avoided, and barometric altitude computers (with their inherent dependence on local pressure conditions), while not used directly to measure altitude, are used nevertheless to provide pressure change signals (which closely track altitude changes), a job done well by barometric altimeters regardless of local pressure conditions.

As to the landing control system itself, the invention is directed principally to the flare-out and final (or touchdown) phases of the landing maneuver. Here, the technique is to define a flare path course which intersects the ILS glide slope course at a first predetermined altitude, and then to start to couple to the flare path course at a second predetermined altitude below the first altitude, thereby causing what will appear to the flight control system as an open loop pitch-up command (without need for eventual cancellation of the command) as the craft flies to lock onto the defined flare path. Hence, the invention will operate to provide the pitch bias wipe-out function designed into the apparatus of copending application S.N. 347,582, also assigned to the instant assignee. In its presently preferred form the invention in essence adopts the flare-out technique of U.S. Patent 2,841,345, in the name of Halpert et al., and assigned to the instant assignee, i.e. an exponential flare path that asymptotically approaches a reference (for example one below ground level as may be provided by particular adjustments to system parameters) is defined by equating altitude and altitude rate signals. Where the invention departs from the invention of U.S. Patent 2,841,345, however, is in the form of the flare initiation control (element 25 of U.S. Patent 2,841,345) employed for coupling the flare path defining apparatus to the craft automatic flight control system. Here with the present invention, while path control is per $h - a\dot{h} = 0$ (where $h$ and $\dot{h}$ represent respectively craft altitude and altitude rate and $a$ is a constant), initiation of such path control is only after a signal representative expression $h - a(\dot{h} - K)$ goes to zero, where $K$ represents a bias dependent for magnitude on craft and course conditions. Hence, the altitude at which flare-out will start will be below the altitude at which the altitude signal $h$ equates exactly with the altitude rate signal $\dot{h}$, thereby providing the above-mentioned apparent open loop command. A side advantage to this kind of flare-out initiation scheme is this: Were the craft to have too high a rate of descent as may, for example, be caused by weight and wind conditions, the signal $\dot{h}$ will correspondingly increase, whereby the flare-out initiation point will desirably float to a higher altitude, thereby giving the craft more needed time to couple to the defined path.

During the touchdown phase of the landing maneuver, the term $h$ is limited, whereby the altitude rate term $\dot{h}$ is held constant, causing the craft to fly for a brief time a straight-line descent into the ground (and not float above it). This prevents the craft touchdown point from varying appreciably when, during the final stage of an asymptotic landing maneuver, the commanded descent rate is negligible.

A principal object of the invention is to provide an improved landing control system.

Another object of the invention is to provide flare path control apparatus for aircraft.

Another object of the invention is to provide a flare-out landing control system which provides a built-in pitch bias wipe-out feature.

Another object of the invention is to provide a flare-out landing system which so selects the point for initiation of a flare-out maneuver that not only is undesired pitch bias cancelled, but the point is free to float higher in altitude as a direct function of craft descent rate.

Another object of the invention is to provide an altitude computer for use with a landing control system.

Another object of the invention is to provide altitude computing apparatus that provides a measure of absolute altitude without need for radio transmitting means such as is employed with radar apparatus.

Another object of the invention is to provide an absolute altitude computer employing a barometric altimeter as a sensing device.

Another object of the invention is to provide an absolute altitude computer that employs apparatus responsive to cooperating marker beacon and glide slope radio beams in conjunction with a barometric sensing element.

The invention will be described with reference to the figures wherein.

Figure 1:
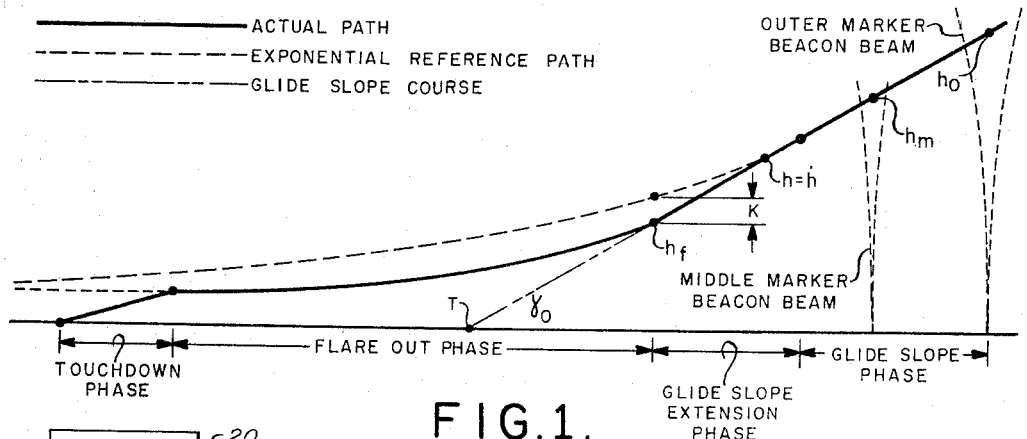
FIG. 1 is a landing profile diagram useful in describing the present invention.

Referring to the landing profile diagram of FIG. 1, the actual course that a craft employing the invention is made to fly is depicted as having a first straight-line portion, a curve or flare-out portion, and a second straight-line portion. The first straight-line portion of the profile includes both the periods of flight when the craft is held under control of the ILS and also the period of flight (glide slope extension) that the craft is controlled to a previously memorized glide path, which latter phase and apparatus for its implementation are amply described in the aforesaid U.S. Patent 3,115,319. Outer and middle marker beacon beams are shown intersecting the ILS defined glide slope course at altitudes $h_o$ and $h_m$ respectively. The altitudes $h_o$ and $h_m$, which are known for the different airports, will vary from airport to airport and will depend principally on the respective ranges of the marker beacons from the ILS glide slope transmitter location T, and also on the angle $\gamma_o$ that the defined glide slope makes with the earth.

Knowing the altitude $h_m$, a pilot flying the glide slope phase of a landing maneuver may appropriately set a signal generator 10 (FIG. 2), e.g. a suitably excited potentiometer, to provide a signal $h_m$ by means of which a signal $h$ representing absolute altitude (when the craft is below the altitude $h_m$) may be computed. A barometric altitude sensor 12, e.g. the sensor of U.S. Patent 3,100,858 filed in the name of Topazio et al. and assigned to the instant assignee, provides an altitude signal $h_B$ and applies that signal through a switch 14 to a memory device 16 which may, for example, take the form of a capacitor having a long time constant. The output signal from the memory device 16 and the signal $h_B$ from the sensor 12 are both applied to a difference circuit 18, which thereby has no output signal so long as the memory device tracks its input signal $h_B$, i.e. while the switch 14 is closed. A marker detector 20, which may take the form of a receiver tuned to the frequency of the middle marker beam as described in Electronic Avigation Engineering, Peter C. Sandretto, copyrighted 1958 by International Telephone and Telegraph Corporation, paragraph 2.28 beginning on page 111, provides a signal to a self-holding relay 22 which operates to open the switch 14. Once the switch 14 opens, the difference circuit 18 provides a signal $\Delta h_B$ representing the instantaneous change in barometric altitude with respect to the barometric altitude had at the altitude $h_m$. The signal $\Delta h_B$ is then algebraically combined with the signal $h_m$ (preset into the signal generator 10) by means of a difference circuit 24, whereby the absolute altitude signal $h$ is thereby provided and in a manner excluding the undesirable features of both barometric and radar altimeters.

Need for an absolute altitude signal results from the requirement that the points along the landing profile at which the flare-out and touchdown phases must commence must be precisely determined. With this as background, reference should now be had to FIG. 3 which shows an overall landing control system embodying the principal feature of the invention. An absolute altitude computer 30, e.g. preferably the circuit of FIG. 2, applies its output signal $h$ to a summation device 32 which device also receives the altitude rate signal $\dot{h}$ from a rate circuit 34 adapted to differentiate the altitude signal $h$. Hence, the summation device 32 may apply a (flare-out control) signal $h-\dot{h}$ to a first contact A of a switch 36.

A glide slope receiver and extension apparatus 38, e.g. as described in aforesaid U.S. Patent 3,115,319, for use in controlling a craft when it is above its flare-out altitude $h_f$ applies an output control signal to a second contact B of the switch 36, which switch is arranged to have its wiper normally held against the switch contact B. The two signals $h$ and $\dot{h}$ applied to the summation device 32 are also applied to a summation device 40, which device is adapted to receive also a bias signal K of a value dependent on the flare course desired for the particular craft concerned (see FIG. 1). A null detector and self-holding relay 42, adapted to move the switch 36 wiper from its contact B to its contact A when the expression $h-(\dot{h}-K)$ goes to zero, may be arranged to take the form of the circuit 34 of U.S. Patent 3,115,319. When this occurs, the signal $h-\dot{h}$ gets applied to the craft automatic flight control system (AFCS), whereby the craft is caused to fly a flare path and thereby cancel the signal $h-\dot{h}$, i.e. make $h-\dot{h}=O$. Therefore, while a craft employing the landing control system of the present invention may start to fly an exponential flare course at an altitude when $h=\dot{h}$, such is deliberately prevented (by means of the bias signal K) until the altitude $h_f$ is reached, whereby the aforementioned apparent open loop command gets built into the system.

Figure 4:
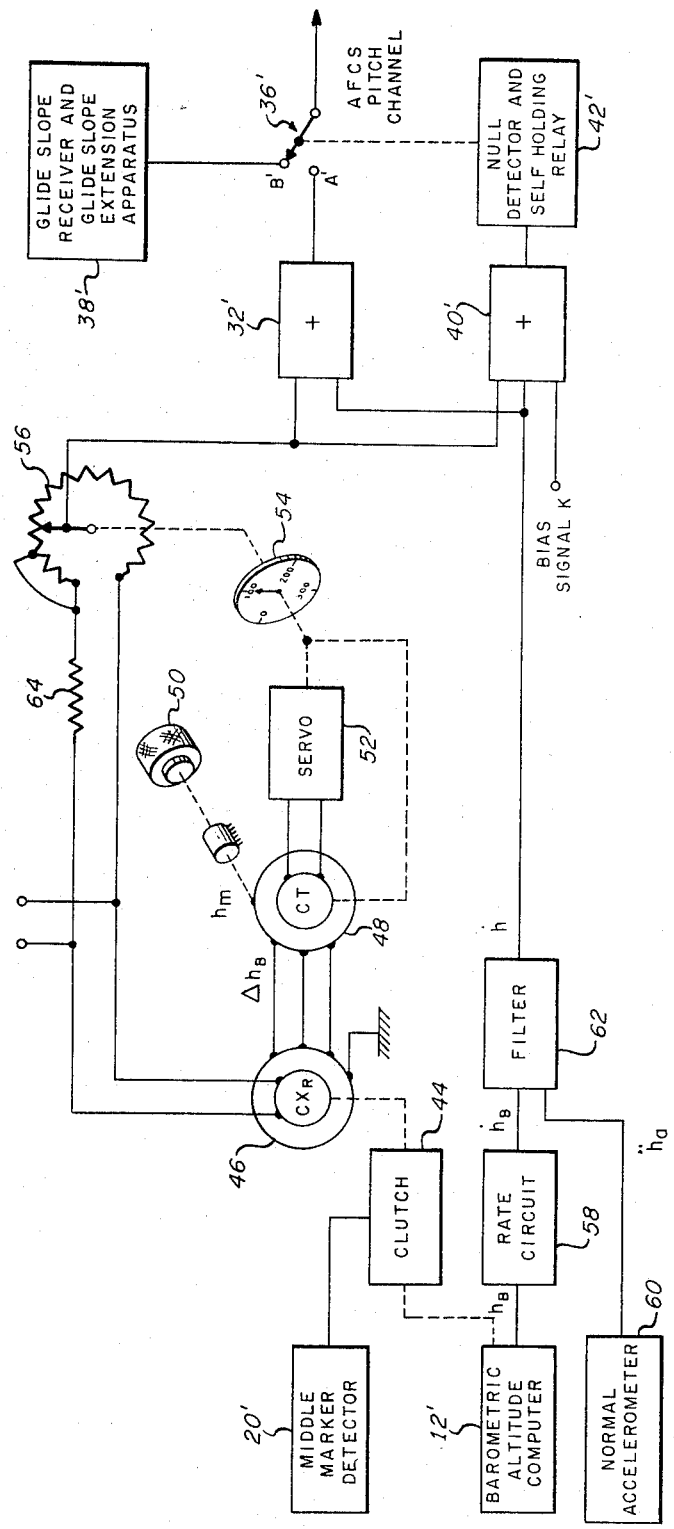
FIG. 4 is a diagram showing a landing control system embodying both aspects of the invention in their presently preferred forms.
Figure 2:
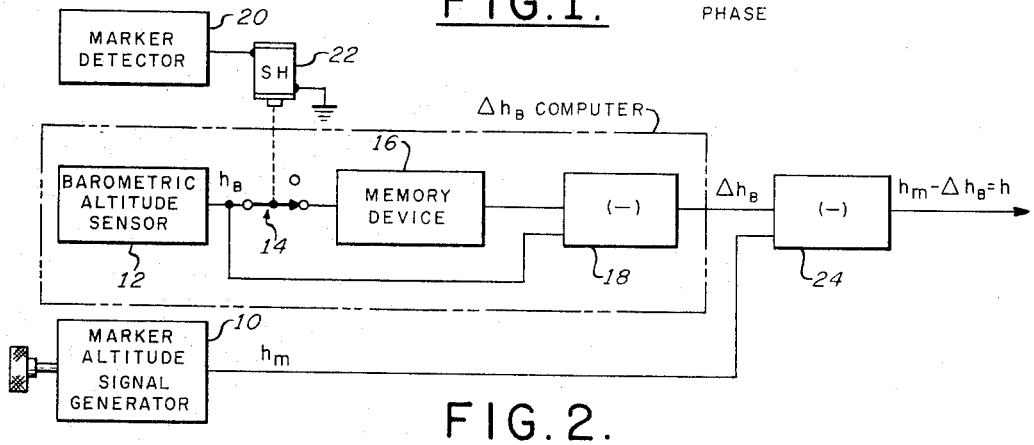
FIG. 2 is a block diagram showing an absolute altitude computer embodying one aspect of the invention.
Figure 3:
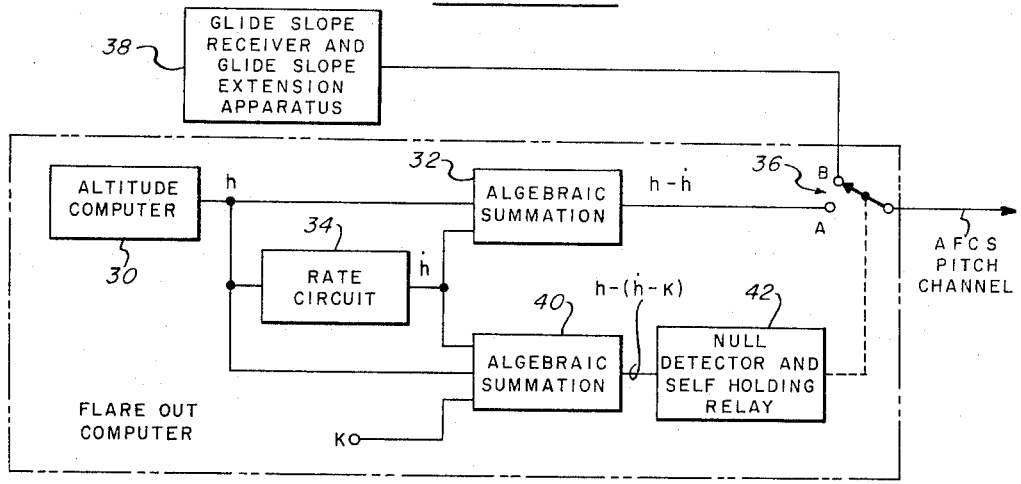
FIG. 3 is a block diagram of a landing control system embodying a second aspect of the invention.

FIG. 4 shows the aspects of the invention as taught with relation to FIGS. 2 and 3 embodied in a presently preferred form of the invention which form also provides for a straightline final or touchdown descent command as stated above. A barometric altitude computer 12' like the computer of U.S. Patent 3,100,858 and providing mechanical and electrical representations of barometric altitude $h_t$ applies its mechanical output to a normally disengaged electrically operated clutch 44. The output of the clutch 44 connects to the rotor of a synchro transmitter 46, the stator of which is mechanically grounded to the frame of the aircraft. The clutch 44 is engaged by means of a signal output from a middle marker detector 20'. Therefore, the clutch 44 and synchro 46 perform the functions of the FIG. 2 elements 16 and 18 in that they cause a signal $\Delta h_B$ on the synchro 46 stator windings to be representative of the difference between barometric altitude at the instant the clutch 44 engages and the instantaneous barometric altitude. The signal $\Delta h_B$ is applied to a control transformer 48, the case and stator of which may be geared for rotation (with respect to the frame of the aircraft) by means of a knob 50 in proportion to a preset middle marker altitude signal $h_m$ for the airport concerned, whereby the control transformer inherently algebraically sums the signals $\Delta h_B$ and $h_m$ and applies such sum signal to its rotor. The control transformer rotor output signal is applied to a suitably damped servo 52, the output of which drives an absolute altitude indicator 54, the wiper of a potentiometer 56, and the control transformer rotor (to cancel the servo input signal).

The barometric altitude signal from the computer 12' is applied to a rate circuit 58 to provide a long term rate signal $\dot{h}_B$. A normal accelerometer 60 applies its output signal $\ddot{h}_a$ to a filter 62 which not only integrates the signal $\ddot{h}$ to provide a short term altitude rate signal $\dot{h}_a$, but combines the long and short term rate signals $\dot{h}_B$ and $\dot{h}_a$ to provide a broadband altitude rate term $\dot{h}$. Elements 32', 36', 38', 40' and 42' perform the same function as FIG. 3 elements 32, 36, 38, 40 and 42 respectively, with the altitude signal $h$ being derived from the wiper of the potentiometer 56 and the rate signal $\dot{h}$ being derived from the filter 62.

A power source excites the rotor of the synchro transmitter 46, and also the potentiometer 56 through a limiting resistor 64. The potentiometer 56 has part of its "low altitude" and shorted to that end.

*Operation.*—During a landing maneuver and prior to reaching the altitude $h_m$, i.e. with the clutch 44 disengaged, the pilot turns the knob 50 until his absolute altitude indicator 54 reads the altitude at which he must intercept the middle marker beam while flying along the glide slope and under control of element 38'. As the pilot turns the knob 50, the case and stator of the synchro control transformer 48 rotate to cause the control transformer rotor to apply a signal to the servo 52. Instantly, the servo follows up to drive the indicator to indicate the altitude $h_m$ selected. As the craft descends (above the altitude $h_m$) along the glide slope, the indicator 54 reading remains fixed. On reaching the altitude $h_m$, however, the middle marker detector applies a signal to engage the clutch 44, whereby barometric altitude changes appear as a signal $\Delta h_B$ on the stator of the synchro transmitter 46, and thence get applied to the control transformer 48 stator. This signal $\Delta h_b$ is then induced into the control transformer rotor for application to the servo 52, causing it (below the altitude $h_m$) to drive the indicator 54 to read accurately absolute altitude.

It should be understood that if a special 100 foot marker beacon would be provided, it would not be necessary for the pilot to set in the intersection altitude since this value would always be the same, namely, 100 feet.

On reaching the absolute altitude at which the potentiometer 56 wiper signal equivalent of the indicator 54 reading equates to the signal representative term $\bar{h}-K$, control of the craft switches from the output of the apparatus of element 38' to the output of the element 32'. Henceforth, as the craft flies to follow the exponential reference course (as defined by the expression $h-a\bar{h}=O$) and thereby flare-out, the wiper of the potentiometer 56 continues (now at a slower rate than when the craft was between the altitudes $h_m$ and $h_f$) to drive toward the shorted section of the potentiometer. On reaching the altitude representing the start of the shorted potentiometer section, the altitude signal on the wiper 56 becomes a constant, which constant is determined by the magnitude of the resistor 64. On application of the constant altitude signal to the element 32', the craft altitude rate $\bar{h}$ is also held constant, whereby the craft may fly to the ground and not float above it.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Landing control apparatus for aircraft having automatic flight control apparatus, comprising first means for use in controlling an aircraft to a defined glide slope course, second means for use in controlling said aircraft to a flare-out course that is less steep than and intersects with the defined glide slope course, switch means for normally connecting said first means to said flight control apparatus and on actuation thereof connecting said second means to that apparatus, and means for actuating said switch means at a predetermined altitude below the altitude at which said courses intersect.

2. The apparatus of claim 1 wherein said means for actuating said switch means at a predetermined altitude includes apparatus for computing absolute altitude after a time when said craft reaches the particular absolute altitude at which a range marker beacon beam intersects the define glide slope course comprising means for producing a signal representing said particular absolute altitude, means for producing a signal representing the instantaneous barometric altitude taken with respect to the barometric altitude had at said particular absolute altitude, and means for algebraically combining both said signals.

3. Apparatus for use by an aircraft during a landing maneuver for computing absolute altitude after a time when said craft reaches the particular absolute altitude at which a range marker beacon beam intersects a defined glide slope course along which said craft is flying comprising means for producing a signal representing said particular absolute altitude, means for producing a signal representing the instantaneous barometric altitude taken with respect to the barometric altitude had at said particular absolute altitude, and means for algebraically combining both said signals.

4. Apparatus for use in controlling an aircraft during a landing maneuver, said aricraft having an automatic flight control system, comprising first means for use in controlling said aircraft along a substantial straight descent course to a runway, means for use in producing a signal representing the absolute altitude of said craft above said runway, means for producing a signal proportional to the rate of change of altitude of said craft, means for algebraically combining the altitude and altitude rate signals to produce a flare-out control signal, and switch means for coupling said first means to said automatic flight control system above some predetermined altitude below the altitude at which said altitude and altitude rate signals are substantially equal, and for coupling the means for producing said flare-out control signal to said automatic flight control system below said predetermined altitude, whereby the craft executes a flare-out maneuver in flying to cancel the flare-out control signal.

5. The apparatus of claim 4 wherein said means for use in producing a signal representing the absolute altitude of said craft above said runway comprises means for producing a first signal representing the absolute altitude, with respect to the runway, at which a range marker beacon beam crosses the straight-line descent course along which said craft is made to fly, means for producing a second signal proportional to the change in barometric pressure with respect to the barometric pressure had when said craft encounters said marker beacon beam, and means for algebraically adding said first and second signals to produce a resultant signal, said resultant signal being representative of said absolute altitude after said craft encounters the beacon beam.

6. Apparatus for use in producing a signal representing the absolute altitude of a craft flying an ILS approach to a runway comprising means for producing a first signal representing the absolute altitude, with respect to the runway, at which a range marker beacon beam crosses the ILS defined descent course along which said craft is made to fly, means for producing a second signal proportional to the change in barometric pressure with respect to the barometric pressure had when said craft encounters said marker beacon beam, and means for algebraically adding said first and second signals to produce a resultant signal, said resultant signal being representative of said absolute altitude after said craft encounters the beacon beam.

7. Apparatus for use in controlling an aircraft during a landing maneuver, said aricraft having an automatic flight conrtol system, comprising first means for use in controlling said aircraft along a sugstantially straight descent course to a runway, means for use in producing a signal representing the absolute altitude of the craft above said runway, means for producing a signal proportionate to the rate of change of altitude of said craft, means for limiting said altitude signal to a predetermined amount to prevent it from reaching zero, means for algebraically combining the limited altitude and altitude rate signals to produce a flare-out control signal, and switch means for coupling said first means to said automatic flight control system above some predetermined altitude below the altitude at which said altitude and altitude rate signals are substantially equal, and for coupling the means for producing said flare-out control signal to said automatic flight control system below said predetermined altitude, whereby the craft executes a flare-out maneuver in flying to cancel the flare-out control signal.

8. The apparatus of claim 7 wherein said means for use in producing a signal representing the absolute altitude of said craft above said runway comprises means for producing a first signal representing the absolute altitude, with respect to the runway, at which a range marker beacon beam crosses the straight-line descent course along which said craft is made to fly, means for producing a second signal proportional to the change in barometric pressure with respect to the barometric pressure had when said craft encounters said marker beacon beam, and means for algebraically adding said first and second signals to produce a resultant signal, said resultant signal being representative of said absolute altitude after such craft encounters the beacon beam.

9. An absolute altitude computer for aircraft comprising barometric altitude computing means, synchro transmitter means, a clutch for coupling said barometric computing means to drive the rotor of said synchro transmitter means, means for engaging said clutch when said aircraft is at a known absolute altitude, means for producing a signal representing said known absolute altitude, and means for algebraically summing the signal on the stator of said synchro transmitter with said known altitude signal to produce a sum signal representing absolute altitude.

10. The apparatus of claim 4 wherein said means for use in producing a signal representing absolute altitude comprises barometric altitude computing means, synchro transmitter means, a clutch for coupling said barometric computing means to drive the rotor of said synchro transmitter means, means for engaging said clutch when said aircraft is at a known absolute altitude, means for producing a signal representing said known absolute altitude, and means for algebraically summing the signal on the stator of said synchro transmitter with said known altitude signal to produce a sum signal representing absolute altitude.

11. An absolute altitude indicator for aircraft comprising barometric altitude computing means, synchro transmitter means, a clutch for coupling said barometric computing means to drive the rotor of said synchro transmitter means, means for engaging said clutch when said aircraft is at a known absolute altitude, means for producing a signal representing said known absolute altitude, servo means adapted to receive said sum signal, and an indicator dial driven by said servo means as it follows up to cancel its applied signal.

12. Landing control equipment for aircraft having autopilot apparatus, comprising means for producing a first signal for controlling a craft along a glide slope, means for producing a second signal for controlling said craft during a flare-out maneuver, said second signal being in proportion to the algebraic summation of craft absolute altitude and altitude rate, means for producing a third signal proportional to the algebraic summation of craft altitude, altitude rate and a predetermined constant, switch means normally applying said first signal to said autopilot apparatus responsive when said third signal goes to zero to apply said second signal to said autopilot apparatus.

13. The apparatus of claim 12 including means for computing absolute altitude after a time when said craft reaches the particular absolute altitude at which a range marker beacon beam intersects the defined glide slope comprising means for producing a signal representing said particular absolute altitude, means for producing a signal representing the instantaneous barometric altitude taken with respect to the barometric altitude had at said particular absolute altitude, and means for algebraically combining both of those signals.

14. The apparatus of claim 12 including an absolute altitude computer for aircraft comprising barometric altitude computing means, synchro transmitter means, a clutch for coupling said barometric computing means to drive the rotor of said synchro transmitter means, means for engaging said clutch when said aircraft is at a known absolute altitude, means for producing a signal representing said known absolute altitude, and means for algebraically summing the signal on the stator of said synchro transmitter with said known altitude signal to produce a sum signal representing absolute altitude.

References Cited by the Examiner
UNITED STATES PATENTS

| | | | |
|---|---|---|---|
| 3,040,568 | 6/1962 | Markusen et al. | 244—77 |
| 3,052,427 | 9/1962 | Match et al. | 244—77 |
| 3,149,226 | 9/1964 | Campbell | 235—150.22 |

FERGUS S. MIDDLETON, *Primary Examiner.*